(12) United States Patent
Strater et al.

(10) Patent No.: US 11,510,121 B2
(45) Date of Patent: *Nov. 22, 2022

(54) WIRELESS CLIENT DEVICE DETECTION AND STEERING ON A NETWORK WITH MULTIPLE ACCESS POINTS

(71) Applicant: ARRIS Enterprises LLC, Suwanee, GA (US)

(72) Inventors: Jay Strater, San Diego, CA (US); Gregory Nakanishi, San Diego, CA (US); Paul D. Baker, San Diego, CA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/191,323

(22) Filed: Mar. 3, 2021

(65) Prior Publication Data
US 2021/0195489 A1 Jun. 24, 2021

Related U.S. Application Data

(63) Continuation of application No. 16/185,006, filed on Nov. 8, 2018, now Pat. No. 10,959,144.

(51) Int. Cl.
*H04W 36/08* (2009.01)
*H04B 17/318* (2015.01)
(Continued)

(52) U.S. Cl.
CPC ......... *H04W 36/08* (2013.01); *H04B 17/318* (2015.01); *H04L 43/028* (2013.01);
(Continued)

(58) Field of Classification Search
USPC .................................................. 370/331–332
See application file for complete search history.

(56) References Cited

U.S. PATENT DOCUMENTS

| 8,655,278 B2 | 2/2014 | Laroche et al. |
| 9,282,103 B2 | 3/2016 | Moroney et al. |
| (Continued) | | |

OTHER PUBLICATIONS

PCT International Search Report & Written Opinion, RE: Application No. PCT/US2019/060515, dated Feb. 26, 2020.
(Continued)

*Primary Examiner* — Candal Elpenord
(74) *Attorney, Agent, or Firm* — Wenderoth, Lind & Ponack, L.L.P.

(57) ABSTRACT

A method for automatic steering of client devices accessing a network to a different access point on the network is provided. A network controller of the network device automatically identities a pre-determined type of electronic client device gaining access to the network and automatically designates the client device as non-steerable when identified as the predetermined type of electronic client device. Thus, when the network controller selects a client device for being steered to a different access point of the network during a steering event, client devices designated as non-steerable by the network controller are prevented from being steered and only client devices that are not designated as non-steerable are available as candidates to be steered. A network device is also provided.

18 Claims, 9 Drawing Sheets

(51) Int. Cl.
*H04L 12/26* (2006.01)
*H04W 36/30* (2009.01)
*H04W 36/38* (2009.01)
*H04W 40/30* (2009.01)
*H04L 43/028* (2022.01)
*H04L 43/16* (2022.01)

(52) U.S. Cl.
CPC ............ *H04L 43/16* (2013.01); *H04W 36/30* (2013.01); *H04W 36/38* (2013.01); *H04W 40/30* (2013.01)

(56) References Cited

U.S. PATENT DOCUMENTS

| | | | |
|---|---|---|---|
| 9,330,250 | B2 | 5/2016 | Medvinsky et al. |
| 9,838,948 | B2 | 12/2017 | Ardeli et al. |
| 9,876,691 | B2 | 1/2018 | Strater et al. |
| 9,913,193 | B2 | 3/2018 | Ho et al. |
| 9,980,192 | B2* | 5/2018 | Williams ............... H04W 76/11 |
| 10,004,102 | B2 | 6/2018 | Chen et al. |
| 2013/0095846 | A1 | 4/2013 | Brisebois et al. |
| 2016/0029295 | A1* | 1/2016 | Nagaska ............ H04B 17/318 370/237 |
| 2016/0119846 | A1* | 4/2016 | Chou ................ H04W 72/0486 370/331 |
| 2016/0135100 | A1* | 5/2016 | Teyeb ................... H04W 36/22 370/331 |
| 2016/0183147 | A1* | 6/2016 | Da Silva ............... H04W 36/22 370/331 |
| 2016/0249267 | A1 | 8/2016 | Ho et al. |
| 2017/0111854 | A1 | 4/2017 | Ho et al. |
| 2017/0332292 | A1 | 11/2017 | Ponnuswamy |
| 2018/0176284 | A1 | 6/2018 | Strater et al. |
| 2018/0206184 | A1 | 7/2018 | Bahr et al. |
| 2018/0288635 | A1 | 10/2018 | Kaushik et al. |
| 2018/0359648 | A1* | 12/2018 | Savalle ............... H04W 64/003 |
| 2019/0075469 | A1 | 3/2019 | Mahoney et al. |
| 2019/0320385 | A1 | 10/2019 | Bhartia et al. |
| 2020/0068440 | A1 | 2/2020 | Talbert et al. |

OTHER PUBLICATIONS

International Preliminary Report on Patentability and Written Opinion of the International Searching Authority dated May 11, 2021 in International (PCT) Application No. PCT/US2019/060515.

* cited by examiner

WIRELESS CLIENT DEVICE DETECTION AND STEERING ON A NETWORK WITH MULTIPLE ACCESS POINTS

BACKGROUND

The term "Wi-Fi" refers to a technology for wireless local area networking of electronic devices, for instance, as based on IEEE 802.11 standards. These standards, for instance, define various frame types that stations (network interface cards and access points) use for communications, as well as for managing and controlling wireless links.

A Wi-Fi network, such as a wireless local area network (WLAN) at a home, residence facility, business, or the like, may provide Wi-Fi service to various wireless electronic client devices, for instance, via a Residential Gateway or like gateway device positioned at the edge of a network and one or more wireless extenders positioned throughout the network providing access points to the network. Each access point is typically provided by a networking hardware device that enables a Wi-Fi client device to connect to the Wi-Fi network.

SUMMARY

According to an embodiment, a method of automatic steering of electronic client devices from one access point to another on a network having multiple access points is provided. The method includes a step of automatically identifying with a network controller of the network a pre-determined type of electronic client device (i.e., an IoT device or the like) having access to the network via wireless communications with one of the access points of the network. The method also includes the step of automatically designating an electronic client device, which may otherwise be steerable, as being non-steerable when identified by the network controller as the predetermined type of electronic client device (i.e., steering is prevented). Accordingly, when the network controller selects an electronic client device for steering to a different access point of the network during a steering event, one or more electronic client devices designated as non-steerable by the network controller is/are prevented from being steered and only electronic client devices that are not designated as non-steerable are available as candidate stations to be steered.

According to another embodiment, a network device for a wireless local area network having multiple access points is provided. The network device has a network controller configured to steer electronic client devices to a different access point of the network upon detection of a steering event. The network controller is also configured to automatically identity a pre-determined type of electronic client device having access to the network via wireless communications with one of the access points of the network and to automatically designate an electronic client device as non-steerable when identified as the predetermined type of electronic client device. Accordingly, when the network controller selects an electronic client device for steering to a different access point of the network during a steering event, electronic client devices designated as non-steerable by the network controller are prevented from being steered and only electronic client devices that are not designated as non-steerable are available as candidates to be steered.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

A Media Access Control (MAC) address is a hardware identification number that uniquely identifies each client device and each node on a network. A Basic Service Set (BSS) is a set of all stations that may communicate with each other. Every BSS has an ID referred to a BSSID, which is a MAC address of the access point servicing the BSS. An Extended Service Set (ESS) is a set of connecting BSS. Each ESS has an ID referred to as a service set identifier (SSID), encryption type (e.g. WPA2), and encryption key. The SSID provides a network name which is typically provided as a case sensitive, thirty-two alphanumeric character, unique identifier attached to the header of packets sent over a wireless local area network (WLAN ESS). The SSID differentiates one WLAN from another, so that all access points and all devices attempting to connect to a specific WLAN must use the same SSID to enable effective roaming.

Gateways, router devices, modems, and the like are common network devices and customer premises equipment (CPE) used to regulate network traffic across a network or between two or more separate networks, such as a home WLAN and another network (i.e., an access network, wide area network, the Internet, or like external network). For purposes of this disclosure, a gateway device, in particular, is defined as a hardware and/or software device that acts as a "gate" between two separate networks. It may itself be a router and/or include other devices that enable traffic to flow in and out of a local area network, such as a WLAN. While a gateway may protect nodes embedded within a home network, it also may be a node of the home network. The gateway node is typically considered to be on an "edge" of the network as all data must flow through it before coming in or going out of the local area network, such as a home WLAN.

Figure 1:
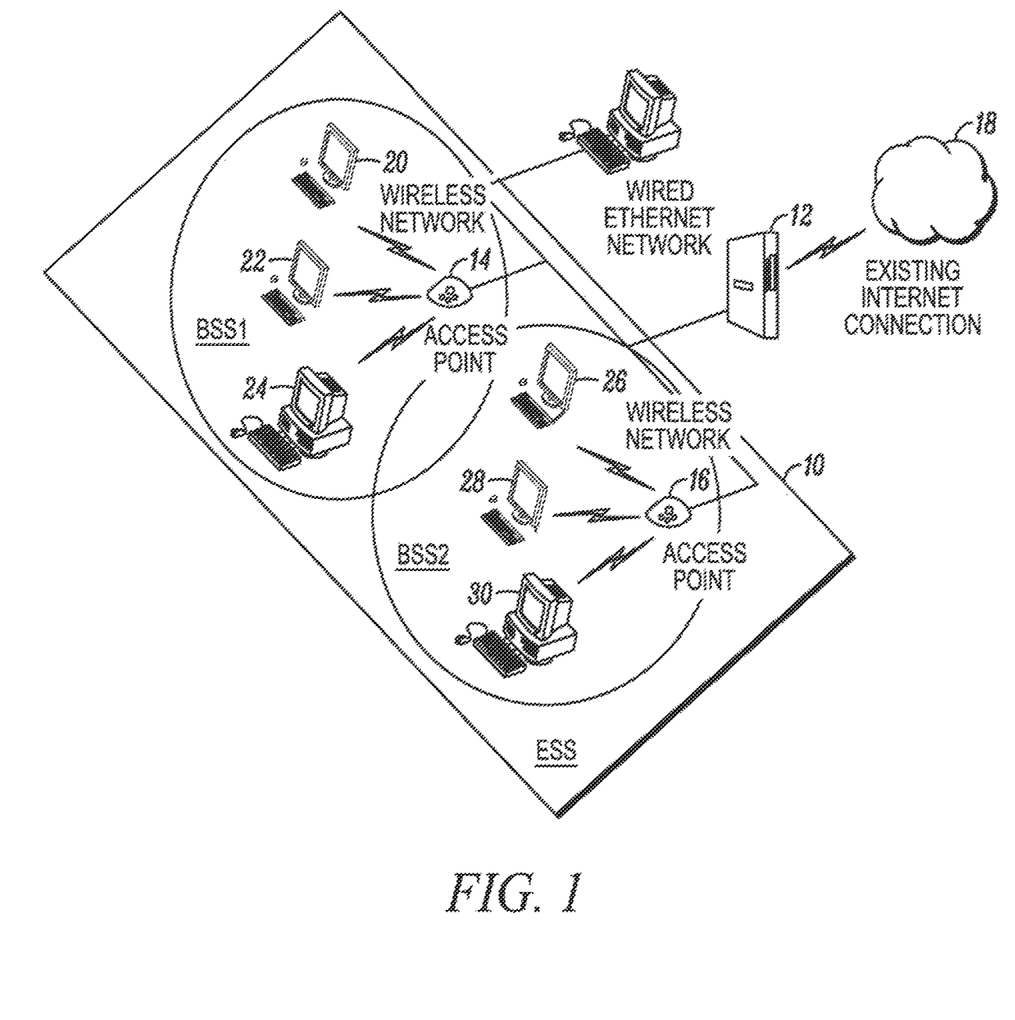
FIG. 1 is a schematic view of a network having multiple access points in accordance to an embodiment.

By way of example, a wireless local area network 10 is shown in FIG. 1. The network 10 includes a gateway device 12 and two extenders 14 and 16. The gateway device 12 connects the local area network 10 to an access network, wide area network, the Internet, or like external network 18. The gateway device 12, itself, could provide an access point (although not shown) to the network 10. Each of the extenders, 14 and 16, which may be a wired or wireless extender, provides an access point to the network 10. Thus, as shown in FIG. 1, extender 14 provides a first BSS (BSS 1), extender 16 provides a second BSS (BSS 2), and the combination provides an ESS. In addition, each extender could provide access points in different bands (i.e., a 2.4 GHz band and a 5 GHz band).

As shown in FIG. 1, client devices 20, 22 and 24 access the network 10 via wireless communications with the access point provided by extender 14 and client devices 26, 28 and 30 access the network 10 via wireless communications with the access point provided by extender 16. Examples of client devices include smartphones, computers, tablet computers, lap top computers, set top boxes (STBs) and the like. Internet of Things (IoT) devices, and any type of electronic client device able to transmit and/or receive wireless communications to and/or from an access point of the network. Examples of IoT devices may include client devices associated with electronic appliances (i.e., lighting, heaters, air conditioners, refrigerators, etc.), sensors (i.e., water, smoke, thermal, glass breaking, etc.), locks (i.e., doors, windows, garage, etc.), security systems (i.e., cameras, etc.), and like devices.

A controller of a wireless local area network may provide the functions of automatically detecting or discovering Wi-Fi devices able to connect to the network and of configuring the Wi-Fi devices to share a common IEEE 802.11 Extended Service Set (ESS) The network controller (i.e., provided by hardware, software, or a combination of hardware and software elements) may be provided within a gateway device, such as gateway device 12 shown in FIG. 1, or in an extender. In addition to the above functions, the network controller according to an embodiment is configured to steer 802.11 stations (client devices) between different bands and different access points (APs) within a network.

By way of example, if the user of client device 20 shown in FIG. 1 moves the client device away from extender 14 and closer to extender 16, the network controller may automatically cause the client device 20 to be steered to the access point defined by extender 16 to improve link quality between the client device 20 and the network 10. Alternatively, if the number of client devices (i.e., stations) connected to an access point is approaching a station count limit for the access point, a network controller may automatically cause the steering/transfer of one or more client devices to a different access point on the network that is not approaching a station count limit. Further, if channel utilization (fronthaul or backhaul) is approaching an overload condition on an access point, the network controller may automatically cause the steering/transfer of one or more client devices to a different access point of the network. Any of the above could define the trigger for a steering event.

Accordingly, a network controller, which may be provided as part of the gateway device, may be configured to automatically steer mobile wireless client devices, detected to have a low quality link to an access point (AP) of the network, to another AP of the network which may be able to provide a higher quality link to thereby address a "stuck" AP issue as the mobile device user moves around a home or like area of the network. This type of steering operation assumes that the AP to which a client device is steered does not have high-utilization or other conditions that would limit the quality of the wireless link.

Such a network controller may also provide automatic client steering for mobile or high-bandwidth stationary client devices between different APs of the network to mitigate overloaded fronthaul (FH) AP channel utilization conditions. This type of steering operation assumes that adequate link quality is provided by the AP to which the client device is steered.

Such a network controller may also steer high-bandwidth client devices between different APs of the network to mitigate over-utilized backhaul (BH) channel utilization conditions (wired or wireless). This type of steering operation assumes that adequate link quality can be provided by the AP to which the client device is steered.

The steering logic of such a network controller may eliminate certain identified client devices from being automatically steered between APs of network. For instance, steering of particular identified client devices may not be considered desirable. By way of example, it may be desirable to prevent steering of a Set Top Box (STB) or like device that may be stationary and may provide a premium video or like service that an operator may want to avoid any chance of impacting due to a steering event. In this case, the operator likely must cause the particular client device to be placed on a no-steer list (i.e., designated as non-steerable) of the network controller.

With respect to STBs, these are typically known devices that can be configured during installation by an operator such as to disable steering. For instance, the STB may be placed on a different ESS (i.e., an ESS on a 5 GHz band or the like) for which steering is disabled or, alternatively, may be configured on a data ESS for which steering exists, but configured to be on a no-steer list (i.e., designated as non-steerable) for the ESS.

Some types of mobile devices may also be deemed steering-unfriendly because they cannot be steered away from an AP or may refuse to be steered to another AP. This condition is often referred to as client "blacklisting" of APs. In some cases, steering-unfriendly mobile devices may be capable of being auto-detected after a configurable number of steering issues and then auto-assigned to a no-steer list. As another alternative, a user may be permitted to manually add a client device to a no-steer list via mobile app or the like.

Another common type of electronic client device that may be deemed to be worthwhile to add to a no-steer list (i.e., designate as non-steerable) is stationary client devices that utilize relative low bandwidth (hereinafter referred to as SLB clients). A common example of a SLB client is a so-called Internet of Things (IoT) device, e.g. water, smoke, thermal sensors, window and door locks, low bandwidth cameras, and the like. Modern households are known to contain various SLB clients in increasing numbers.

A problem with automatic steering of SLB clients by a network controller is that the SLB clients may be subject to frequent steering when, in reality, the SLB clients and network do not benefit from such steering. This is because SLB clients are typically best associated with a nearest-located AP (nearest in terms of signal strength) and the bandwidth usage by SLB clients is typically too low to provide any impact on AP channel utilization. In fact, SLB client steering can actually negatively impact the timeliness of mobile client devices being steered as needed upon a low link quality condition, e.g. from a user moving through a home.

SLB clients can also end up blocking candidate AP selection because of high associated station (STA) counts on one or more APs. This in turn may prevent mobile client devices and other high-bandwidth client devices from being properly steered to these APs, even though the APs may have ample available bandwidth. The end result may be undesired increased congestion on the other APs of a network. It may be possible to address such a problem by auto-increasing candidate AP association count on APs with SLB clients, however, this is only possible if the network controller has sufficient information in advance as to which devices are SLB clients and to which APs the SLB clients are associated.

Unfortunately, SLB clients are not easily auto-identified for assignment to a no-steer list and for auto-adjusting candidate AP association thresholds. In addition, having a user manually identify which client devices are SLB clients by use of a mobile App or the like does not appear to be practical for the average home owner or like novice operator of a local area network.

Figure 2:
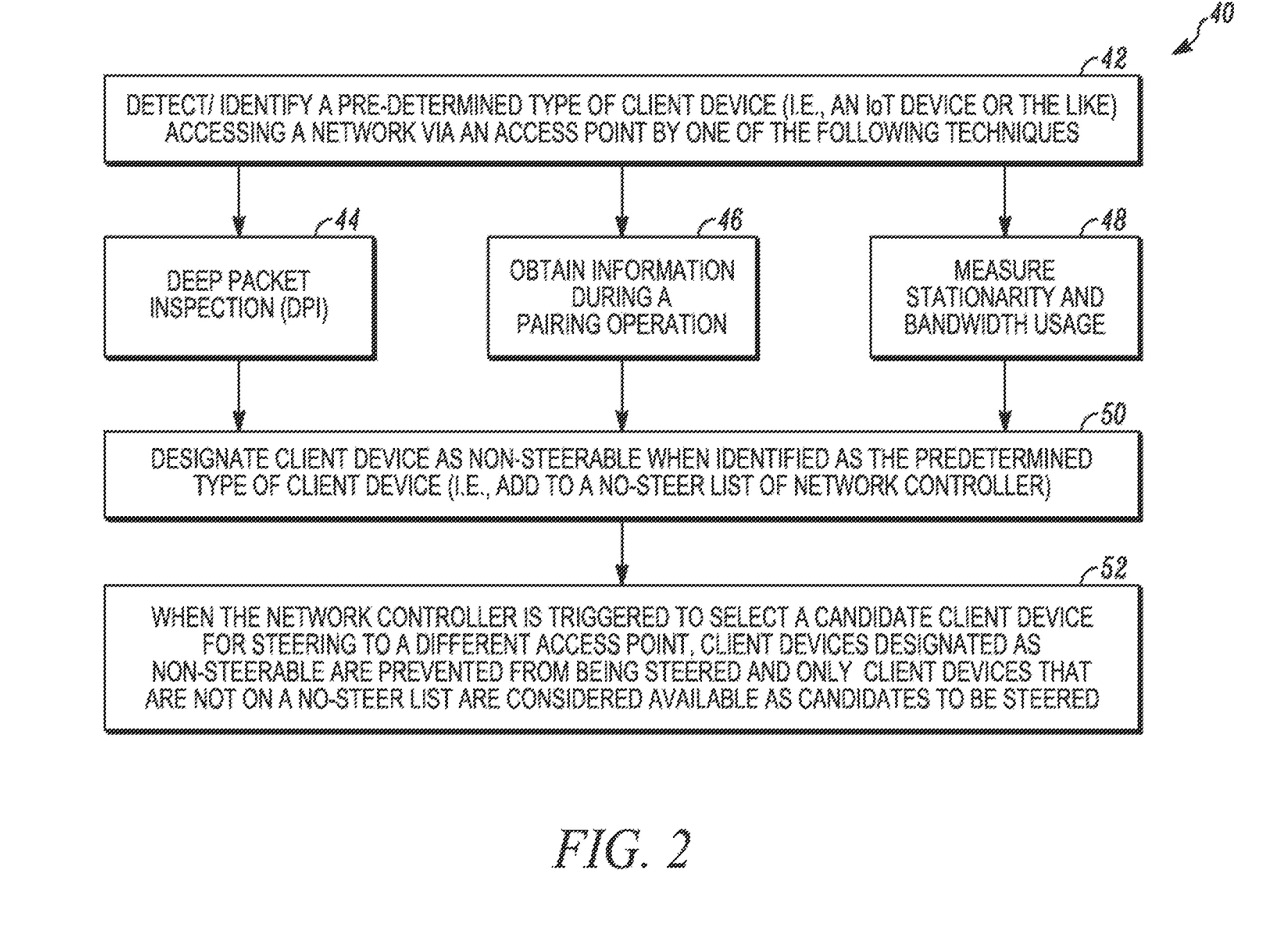
FIG. 2 is a flow chart of a method of detecting a predetermined type of electronic client device (such as a stationary low-bandwidth client device, IoT device, or the like) accessing a network and adding the client device to a no-steer list in accordance to an embodiment.

Thus, according to an embodiment as explained in greater detail below, a network controller of a wireless local area network is configured to automatically detect and identify stationary, low bandwidth client devices (i.e., SLB clients) by one or a combination of techniques thereby avoiding any inconvenient requirement for the network user or operator to manually input or select MAC-address specific information for SLB clients to be placed on a no-steer list or the like. Thus, as shown in FIG. 2, a network controller automatically detects for SLB clients in step 42 of process 40.

According to one embodiment, the network controller may use Deep Packet Inspection (DPI) when available on a home network device to identify client devices as SLB clients. See step 44 in FIG. 2. Deep packet inspection is a type of data processing that inspects in detail the data being sent over a network. Thus, the data being transmitted by a client device could be subject to DPI, and based on this information, the client device could be determined to qualify as a SLB client.

A third-party DPI service may be used and may involve a licensing fee. Such a service may be limited to network controllers residing in a type of gateway device, such as a residential gateway. DPI may be applied to any SLB clients with proper DPI device type classification. Third party DPI engines may support a wide range of device identification categories such device vendor, operating system (OS), class, name, and type. Appropriate device ID categories may be remotely configured by an operator for DPI to identify many SLB clients on the network. As an example, an IoT device for a specific vendor may be appropriately categorized in a "Wireless Lighting" or "Intelligent Home Appliance" category based on vendor information.

According to another embodiment, the network controller may use device information carried in M1 messaging in a Wi-Fi Alliance (WFA) Wi-Fi Protected Setup (WPS) pairing operation conducted between a client device and a home network device to identify a client device as a SLB client. See step 46 in FIG. 2. Such a process would be limited to particular client devices that support Wi-Fi and are configured to provide WPS pairing support and that have WPS used for initial client association to a network M1 messaging in WPS pairing conveys STA manufacturer, model name, model number. Thus, a stored or accessible table of STA manufacturer, model name, model number may be remotely configured for ready use in identifying SLB clients.

According to another embodiment, the network controller may be configured to estimate the presence of an SLB client through logic to determine the stationarity of a client device, such as by lack of Relative Received Signal Strength (RSSI) variation to a given AP over time, and to determine low bandwidth usage by a client device, such as based upon detected low average and peak traffic levels to and from the client device. See step 48 in FIG. 2 RSSI is the relative received signal strength in a wireless environment, in arbitrary units. RSSI is an indication of the power level being received by the receive radio after antenna and possible cable loss. Thus, the higher the RSSI number, the stronger the signal.

This particular method (i.e., detection of lack of RSSI variation and detection of low average and peak traffic levels) provides a general method that can be applied to any client device and does not require DPI, WPS, or the like capabilities. The determination of client stationarity in the above referenced method may require configuration of max RSSI variation for a given period of time, and the determination of low bandwidth usage may require configuration of max average and peak traffic levels for a given period of time.

After a client device on the network is auto-identified by the network controller according to any of the above referenced methods or by other methods, the network controller may then automatically assign (without user or operator action) the identified SLB client to a no-steer list (i.e., designate as non-steerable) for the ESS on which it resides, assuming that the ESS has steering enabled. See step 50 in FIG. 2. As a result of being placed on the no-steer list, the SLB client will be blocked from being subsequently auto-steered by the network controller. See step 52 in FIG. 2.

Figure 3A:
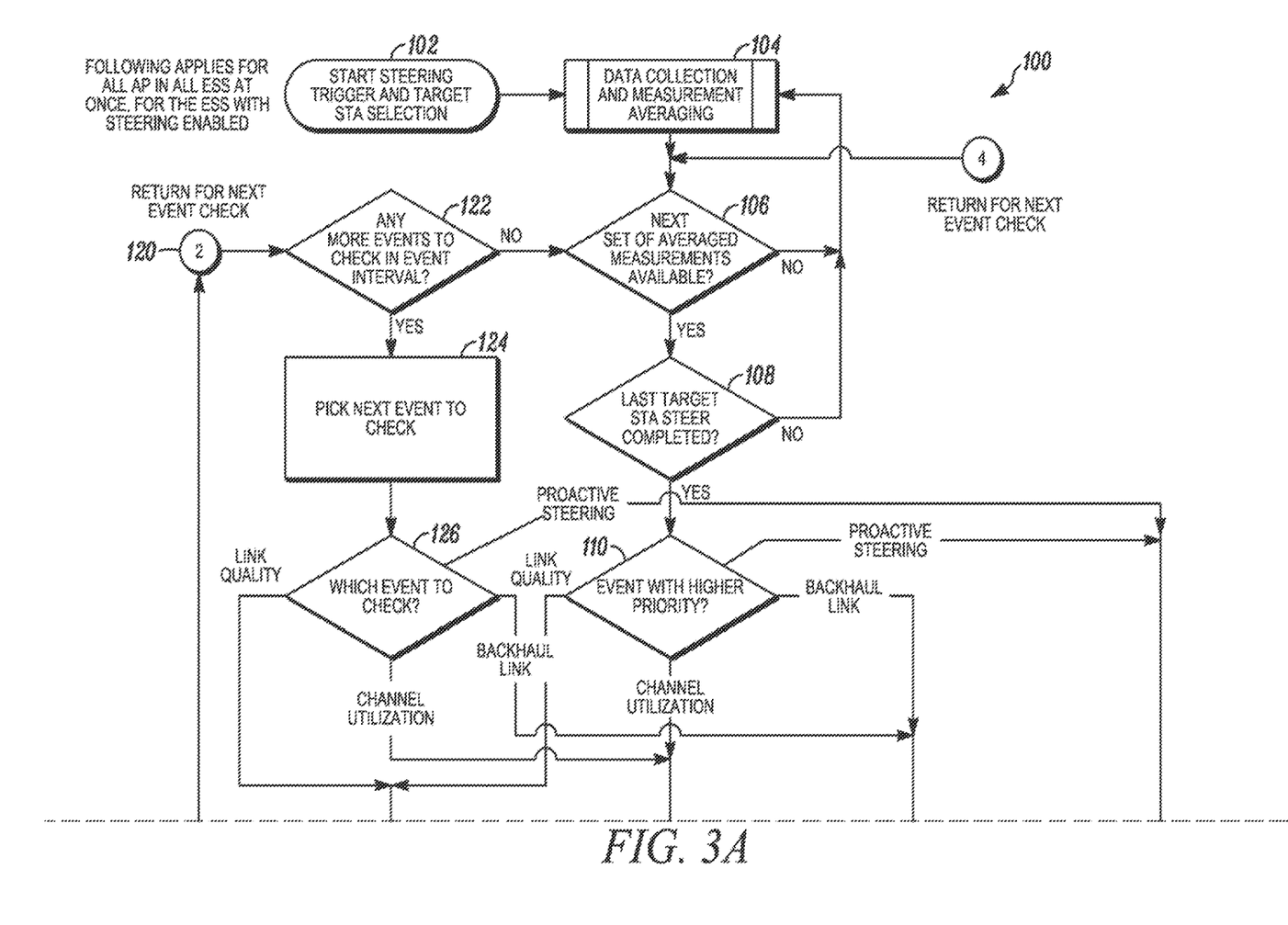
FIGS. 3A, 3B and 3C are partial views intended to form one complete view of a flow chart of a method of producing an ordered list of candidate client devices for steering in accordance to an embodiment.
Figure 3B:
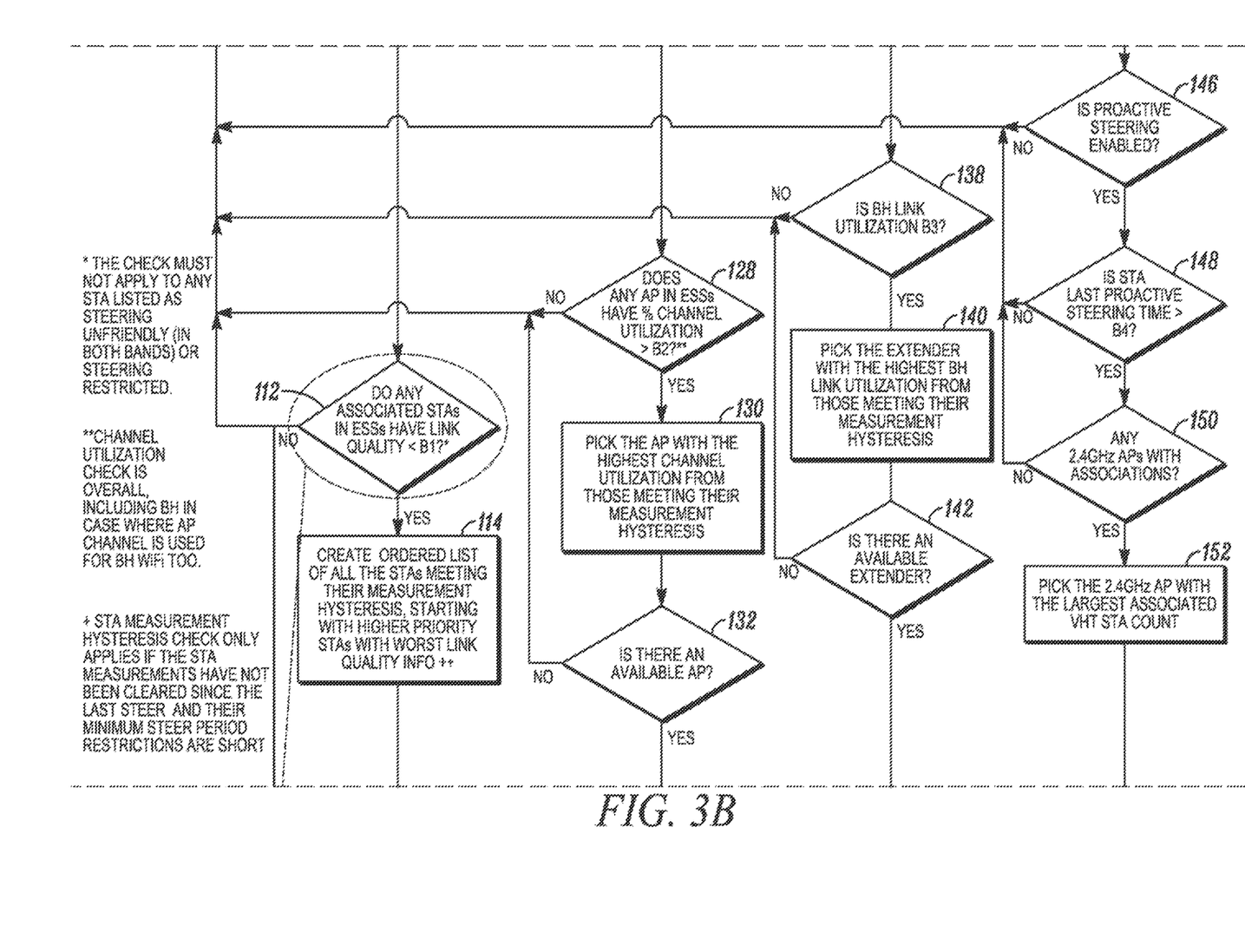
Figure 3C:
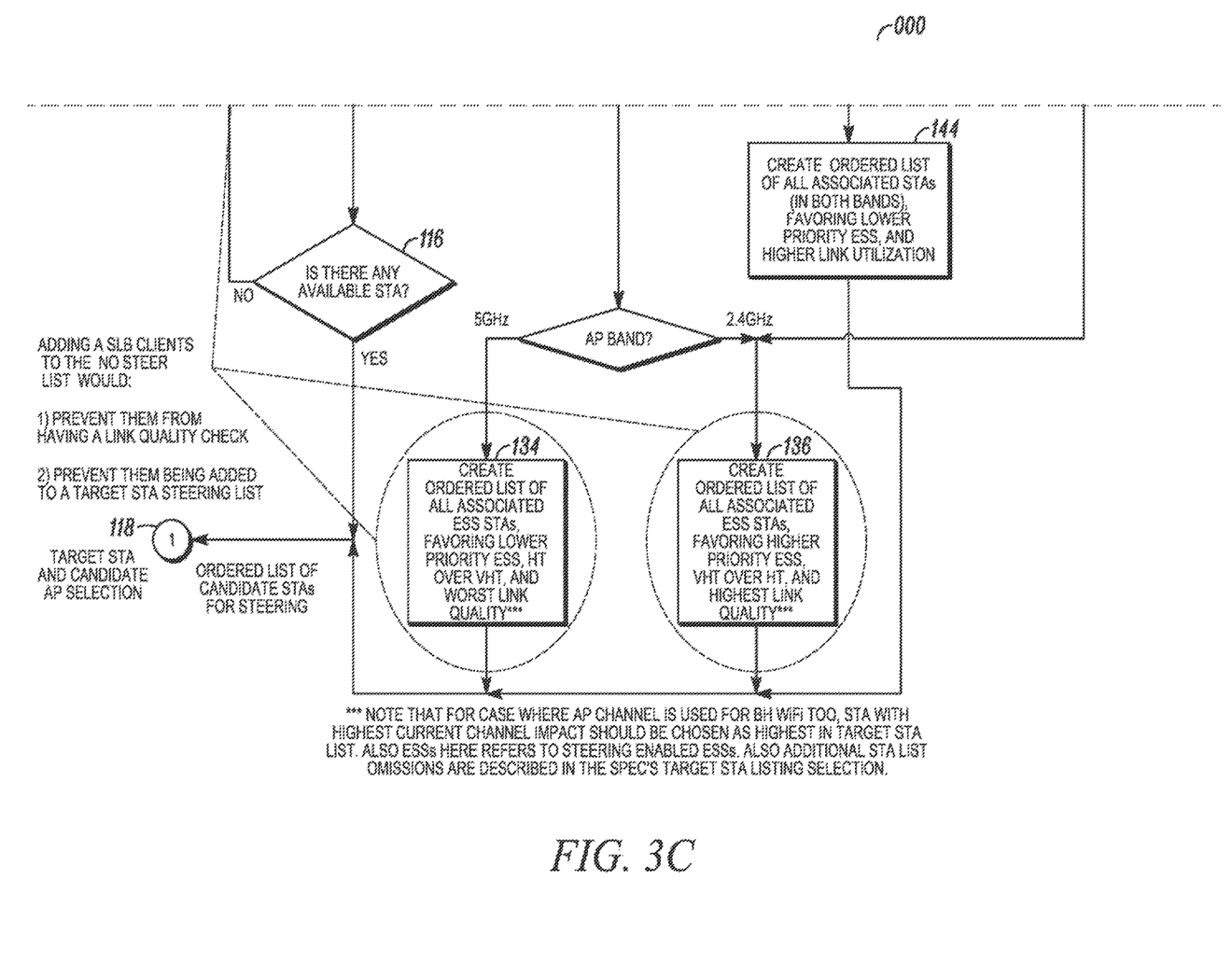

By way of example, FIGS. 3A, 3B and 3C (which are partial views intended to provide one complete view) disclose steering logic 100 for a network controller with respect to adding a detected SLB client to a no-steer list. A steering trigger and target station (STA) selection operation is started in step 102. After data is collected, averaged, and available in steps 104 and 106 and the last steering event has completed (see step 108), an event with a highest priority is determined in step 110.

For a link quality event, stations having link quality below a pre-set value (B1) are determined in step 112. If such a STA is identified as having a link quality issue, then it is added to an ordered list of all stations with worst link quality created in step 114. After all stations have been considered, the ordered list of candidate stations passes through step 116 and the process proceeds in step 118 to candidate AP determination (step 202 in FIG. 4A). Otherwise, if a link quality issue is determined not to exist and/or if no stations are available for steering, then the process proceeds with the next event check in steps 120, 122, 124 and 126. For a SLB client on a no-steer list, a link quality check in step 112 would not be performed and thus such a client device would never be put on the list created in step 114 and would never be subject to steering based on a link quality issue.

For a channel utilization event, APs having percent channel utilization above a pre-set value (B2) is determined in step 128. If one or more APs meet the channel utilization threshold (B2), then an AP with highest channel utilization is selected in step 130, and if at least one AP to which mobile client devices may be steered is determined to be available in step 132, then a list of all possible stations available to be transferred is created in steps 134 (for instance, for a 5 GHz band) and 136 (for instance, for a 2.4 GHz band) and the process proceeds in step 118 to candidate AP determination (step 202 in FIG. 4A). In steps 134 and 136, lower priority ESS stations may be favored over higher priority stations, and high throughput (HT) stations may be favored over very high throughout (VHT) stations. Otherwise, if a channel utilization issue does not exist or an AP to which stations may be steered is not available, then the process proceeds with the next event check in steps 120, 122, 124 and 126. For a SLB client on a no-steer list, such a SLB client would never be added to the lists created in steps 134 and 136 and thus such a client device would never be subject to steering based on a channel utilization issue.

For a backhaul link event, a determination is made as to whether or not backhaul link utilization is above a pre-set value (B3) in step 138. If such a condition is met, then an extender with highest backhaul link utilization is selected in step 140, and if at least one extender to which mobile client devices may be steered is determined to be available in step 142, then a list of all possible stations available to be transferred is created in step 144 and a target station and the process proceeds in step 118 to candidate AP determination (step 202 in FIG. 4A). In step 144, lower priority ESS stations may be favored over higher priority stations Otherwise, if a backhaul link utilization issue does not exist or an extender to which stations may be steered is not available, then the process proceeds with the next event check in steps 120, 122, 124 and 126. For a SLB client on a no-steer list, such a SLB client would never be added to the list created in step 144 and thus such a client device would never be subject to steering based on a backhaul link utilization issue.

For a proactive steering event, if proactive steering is determined to be enabled in step 146, if station last steering time is determined to be above a pre-set value (B4) in step 148, and if one or more 2.4 GHz APs with associations are determined to exist in step 150, then a 2.4 GHz AP with largest associated VHT station count is selected in step 152. Thereafter, a list of all possible stations available to be transferred is created in step 136 and the process proceeds in step 118 to candidate AP determination (step 202 in FIG. 4A). Otherwise, the process proceeds with the next event cheek in steps 120, 122, 124 and 126. For a SLB client on a no-steer list, such a SLB client would never be added to the list created in step 136 and thus such a client device would never be subject to a steering based on a channel utilization issue.

Figure 4A:
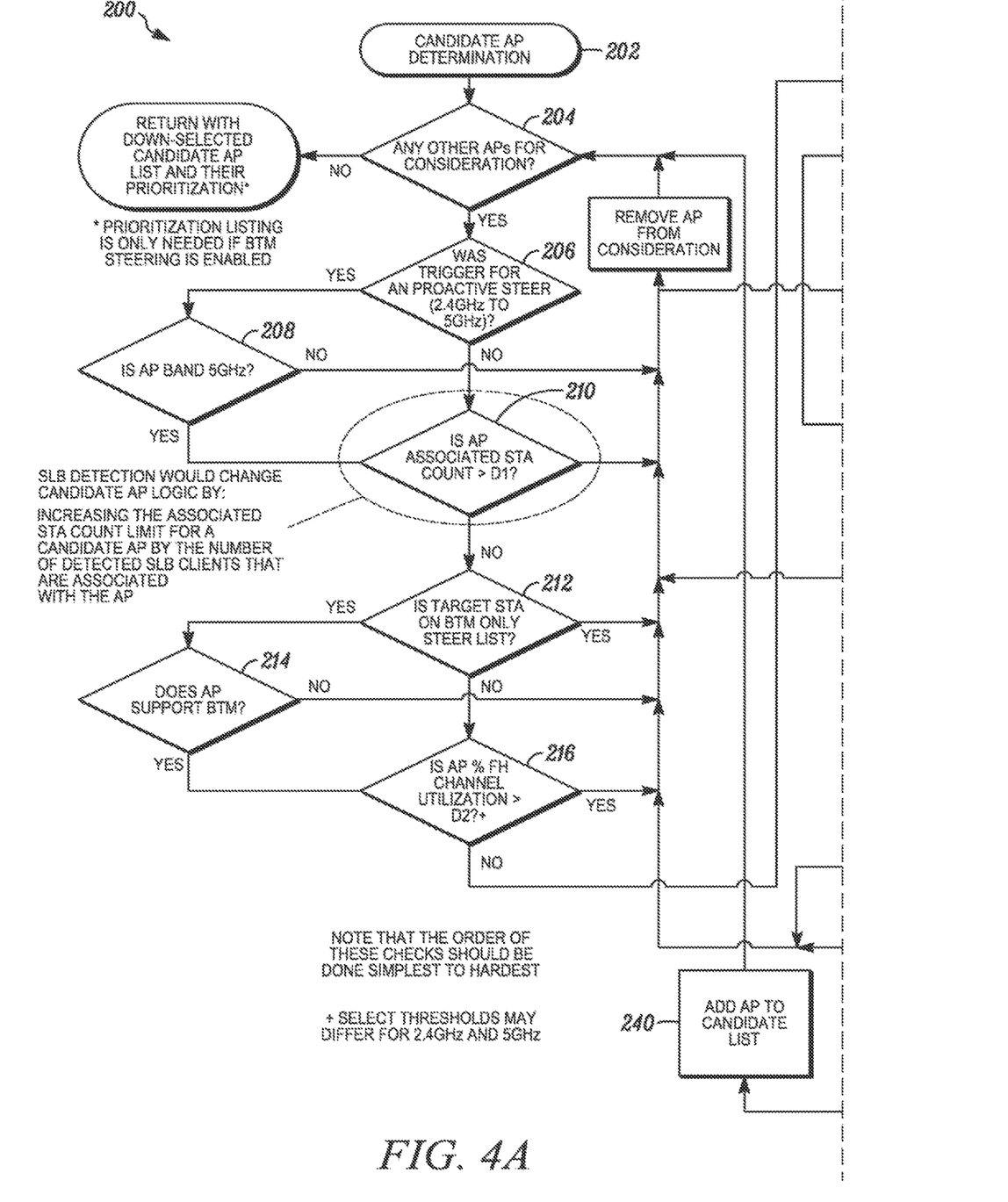
FIGS. 4A, 4B and 4C are partial views intended to form one complete view of a flow chart of a method of producing a prioritized list of candidate access points (APs), with station count limit adjustment, to which candidate client devices may be steered in accordance to an embodiment.
Figure 4B:
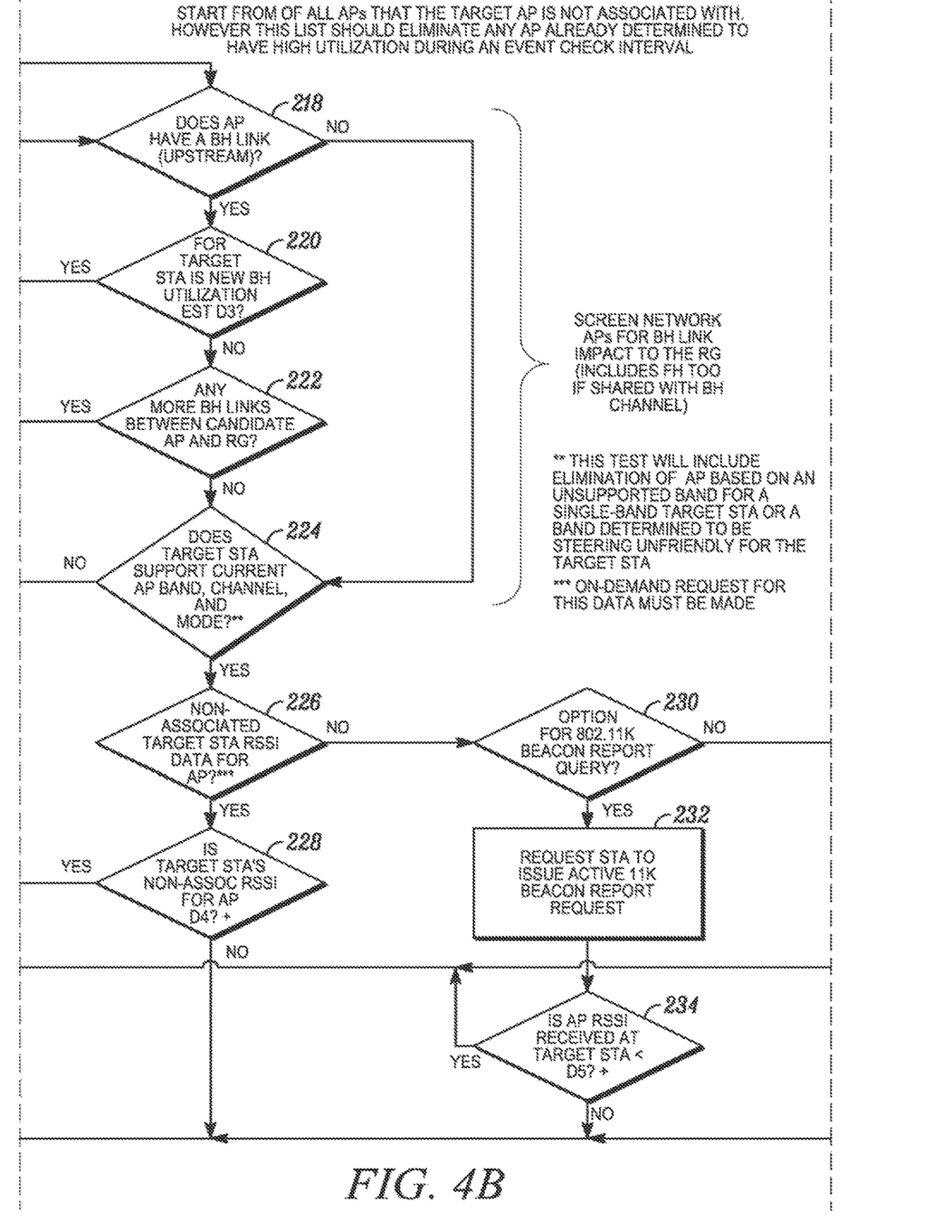
Figure 4C:
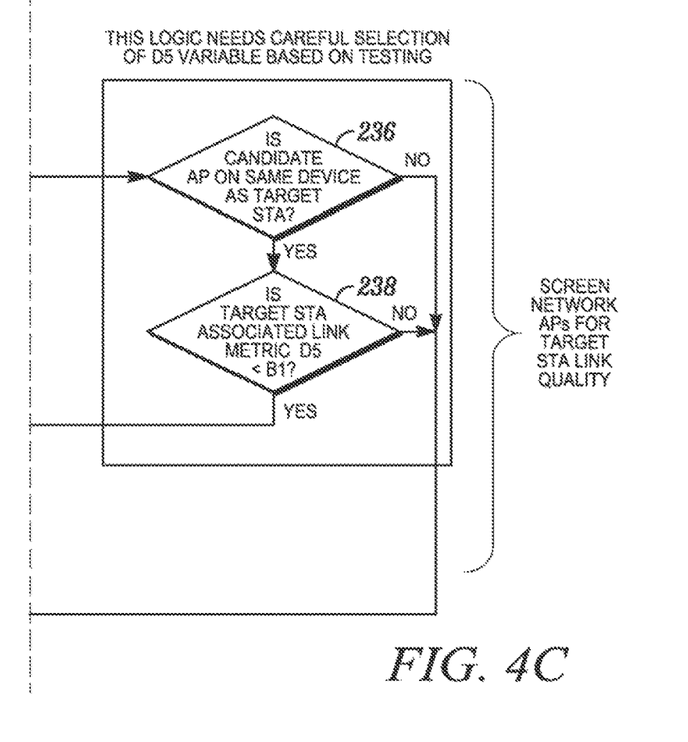

According to an embodiment, the network controller may be configured to automatically adjust candidate AP associated STA count limits based upon a number of known or auto-detected SLB clients associated with a particular AP. For instance, as shown in FIGS. 4A, 4B and 4C (which are partial views intended to provide one complete view), steering logic 200 is provided with respect to candidate AP determination with SLB client association count adjustment.

In step 202, candidate AP determination is initialed, and in step 204 a particular AP is selected for consideration. Steps 206 and 208 determine if the steering event is a 2.4 GHz to 5 GHz proactive steering event and eliminates AP 2.4 GHz bands as potential candidates. Otherwise, in step 210, the AP associated station count for the candidate AP is compared to a pre-determined station count limit or threshold (D1). In this step, the station count limit (D1) is automatically increased by the number of SLB clients detected as being associated with the candidate AP. In this manner, the number of SLB clients associated with a candidate AP will have no effect on whether or not this AP is to be considered a viable AP to which a client device may be steered. If the station count threshold (D1), as adjusted as discussed above, is surpassed, the AP is removed from consideration as a candidate to which a client device may be steered.

If the AP does not have an associated station count issue, then BSS Transition Management (BTM) issues and fronthaul channel utilization issues are checked in steps 212, 214 and 216. If no issues are present and the AP remains a viable candidate for a transfer, the impact of selecting this candidate relative to backhaul link issues are considered in steps 218, 220, 222 and 224. If the AP passes these steps, then the AP is screened relative to a target station link quality in steps 226, 228, 230, 232, 234, 236 and 238. If all these issues are passed, then the AP under consideration is added as a viable candidate for a station (i.e., client device) to be steered. See step 240.

Accordingly, the above referenced embodiments provide a network controller and method for auto-detecting stationary, low bandwidth (SLB) clients (e.g. IoT devices) on a home or like network for preventing such clients from being steered between different APs and bands of the network. Thus, the user, operator or owner of a network, such as a home wireless local area network to which a large number of SBC clients may connect, should better be able to avoid experiencing sluggish mobile device steering as a mobile client device intended to be steered is moved around a home or the local area of the network.

A system for carrying out any of the above disclosed embodiments, methods, or arrangements may include software or the like provided on a circuit board or within another electronic device and can include various routers, modems, processors, microprocessors, modules, units, components, controllers, chips, disk drives, and the like. It will be apparent to one of ordinary skill in the art that gateways, routers, modems, systems, modules, components, units, processors, servers, and the like may be implemented as electronic components, software, hardware or a combination of hardware and software for purposes of providing a system.

Figure 5:
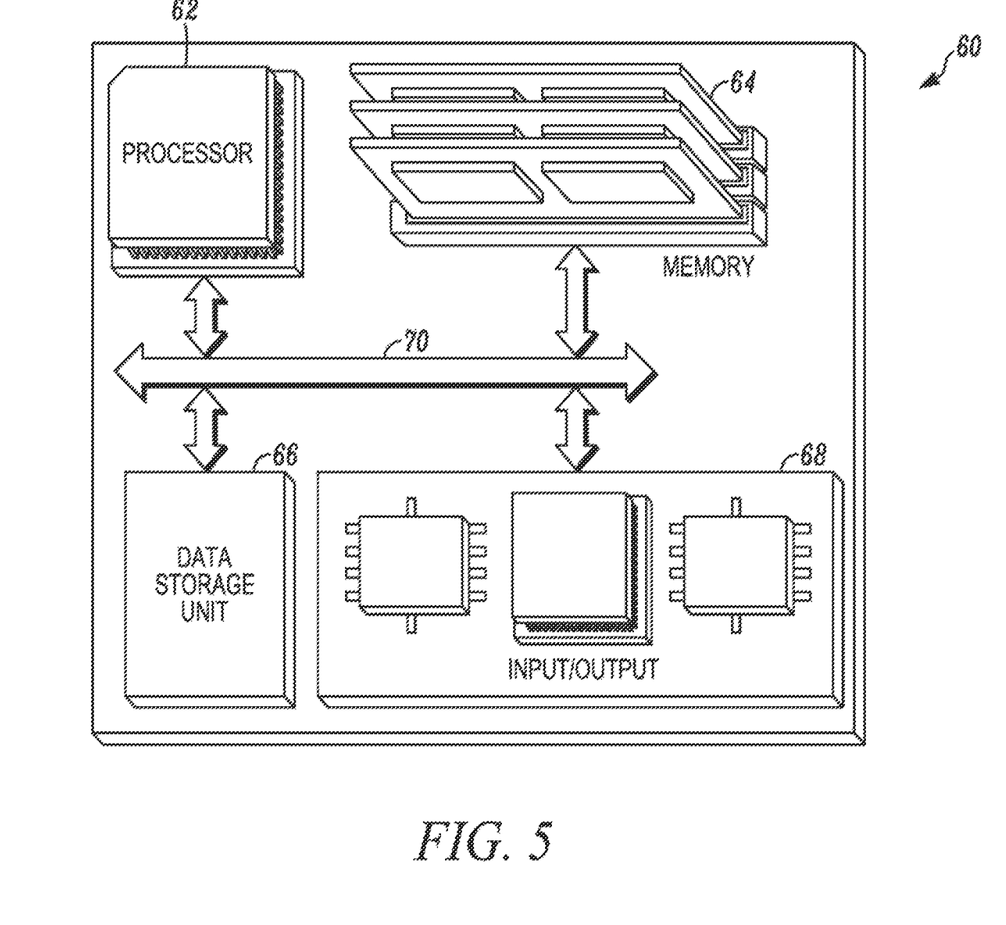
FIG. 5 is a schematic view of a network device in accordance to an embodiment.

By way of example, FIG. 5 is a block diagram of a hardware configuration of a CPE device 60. It should be understood that the hardware configuration may exist in various types of devices, such as gateways, extenders, and the like. The hardware configuration may include a processor 62, memory 64, a storage device 66, an input/output device 68, and the like. Each of the components 62, 64, 66 and 68, for example, may be interconnected using a system bus 70 or the like. The processor 62 may be capable of processing instructions for execution within the hardware configuration and may be capable of processing instructions stored in the memory 64 or on the storage device 66. The processor 62 may be configured to carry out any of the processes or steps discussed above.

The input/output device 68 provides input/output operations for the hardware configuration. In embodiments, the input/output device 68 may include one or more of a network interface device (e.g, an Ethernet card, Multimedia over Coax Alliance (MoCA) connectivity device, G.Hn connectivity device, or other wired connection between a gateway and extender in a home network), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks.

Embodiments may also include at least one non-transitory computer readable storage medium having computer program instructions stored thereon that, when executed by at least one processor, can cause the at least one processor to perform any of the steps described above.

While the principles of the invention have been described above regarding specific devices, apparatus, systems, and/or methods, it is to be clearly understood that this description is made only by way of example and not as limitation. One of ordinary skill in the art will appreciate that various modifications and changes can be made without departing from the scope of the claims below.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims.

We claim:

1. A network controller for automatically steering electronic client devices between multiple access points (APs) of a wireless local area network (WLAN), the network controller comprising:
   a memory storing a program of instructions; and
   a processor configured to execute the instructions to:
      automatically detect at least one electronic client device gaining access to the WLAN via wireless communications with one of the multiple APs as being a pre-determined type of electronic device that is non-steerable;
      automatically assign the at least one electronic client device that is detected as being the pre-determined type of electronic device that is non-steerable to a no-steer list;
      in response to detecting a steering event:
         perform a steering trigger and target station selection operation to generate an ordered list of candidate electronic client devices that are available for auto-steering between the multiple APs of the WLAN, and
         select a candidate electronic client device from the ordered list of candidate electronic client devices to be auto-steered between the multiple APs of the WLAN based on the steering trigger and target station selection operation;
      wherein non-steerable electronic client devices in the no-steer list are excluded from the steering trigger and target station selection operation, such that the at least one electronic client device that is non-steerable is prevented from being automatically assigned to the ordered list of candidate electronic client devices that are available for auto-steering; and
      wherein the pre-determined type of electronic device that is non-steerable includes at least one of:
         devices that are stationary relative to a nearest AP among the multiple APs of the WLAN and have bandwidth usage below a threshold value for at least a predetermined period of time; and
         devices that are identified as being Internet of Things (IoT) devices, set-top boxes (STBs), or mobile devices that cannot be steered or refuse to be steered.

2. The network controller according to claim 1, wherein:
   the multiple APs include a gateway device and one or more wireless extenders, wherein the network controller is included in the gateway device.

3. The network controller according to claim 1, wherein automatically detecting that the at least one electronic client device is the pre-determined type of electronic device that is non-steerable includes performing deep packet inspection (DPI) of traffic from the at least one electronic client device to obtain a device identification category of the at least one electronic device that identifies the at least one electronic device as a stationary low-bandwidth client device, wherein the device identification category includes at least one of device vendor, operating system (OS), class of device, name of device, and type of device.

4. The network controller according to claim 1, wherein automatically detecting that the at least one electronic client device is the pre-determined type of electronic device that is non-steerable includes at least one of:
   obtaining information about the at least one electronic client device during a Wi-Fi protected setup (WPS) pairing operation with the WLAN, and comparing the information about the at least one electronic client device to a stored database to determine whether the at least one electronic client device is a stationary low-bandwidth client device, wherein the information about the at least one electronic client device includes at least one of device manufacturer, model number of device, and model name of device; and
   determining that the at least one electronic client device is stationary relative to a nearest access point among the multiple APs in response to a variation of received signal strength indicator (RSSI) of the at least one electronic client device to the nearest AP over a pre-determined period of time being less than a threshold RSSI variation value, and determining that at least one of a maximum average bandwidth usage and a peak bandwidth usage of the at least one electronic client device over the predetermined period of time is below a threshold bandwidth usage value.

5. The network controller according to claim 1, wherein the steering event may include at least one of:
   a link quality event, in response to detecting a candidate electronic client device having a link quality to an access point among the multiple APs that is below a threshold link quality value,
   a channel utilization event, in response to detecting an access point among the multiple APs having a channel utilization that is greater than a threshold channel utilization value,
   a backhaul link utilization event, in response to detecting an access point among the multiple APs having a backhaul link utilization that is greater than a threshold backhaul link utilization value, and
   a proactive steering event, wherein the candidate electronic client device is steered from an access point among the multiple APs that has an associated station count that is greater than a threshold station count value to a candidate access point among the multiple APs that has an associated station count that is less than the threshold station count value,
   wherein the at least one electronic client device in the no-steer list is not subjected to a link quality check, a channel utilization check, a backhaul link utilization check, or a proactive steering check.

6. The network controller according to claim 1, wherein the processor of the network controller is further configured to execute the computer-readable instructions to:
automatically adjust station count limits of access points among the multiple APs based on a number of the non-steerable electronic client devices in the no-steer list that are associated with each access point, respectively; and
in response to detecting the steering event,
perform a candidate access point determination operation to generate a prioritized list of candidate APs with adjusted associated station count limits to which the candidate electronic client devices may be auto-steered; and
select a candidate AP from the prioritized list of candidate APs to which the selected candidate electronic client device is auto-steered based on the candidate access point determination operation,
wherein access points among the multiple APs having a number of electronic client devices associated therewith that is above the adjusted station count limits are excluded from the candidate access point determination operation, such that the access points exceeding the adjusted station count limits are removed from consideration when generating the prioritized list of candidate APs to which the candidate electronic client devices may be auto-steered.

7. A method for automatically steering electronic client devices between multiple access points (APs) of a wireless local area network (WLAN), the method comprising:
automatically detecting at least one electronic client device gaining access to the WLAN via wireless communications with one of the multiple APs as being a pre-determined type of electronic device that is non-steerable;
automatically assigning the at least one electronic client device that is detected as being the pre-determined type of electronic device that is non-steerable to a no-steer list;
in response to detecting a steering event:
performing a steering trigger and target station selection operation to generate an ordered list of candidate electronic client devices that are available for auto-steering between the multiple APs of the WLAN; and
selecting a candidate electronic client device from the ordered list of candidate electronic client devices to be auto-steered between the multiple APs of the WLAN based on the steering trigger and target station selection operation;
wherein non-steerable electronic client devices in the no-steer list are excluded from the steering trigger and target station selection operation, such that the at least one electronic client device that is non-steerable is prevented from being automatically assigned to the ordered list of candidate electronic client devices that are available for auto-steering; and
wherein the pre-determined type of electronic device that is non-steerable includes at least one of:
devices that are stationary relative to a nearest AP among the multiple APs of the WLAN and have bandwidth usage below a threshold value for at least a predetermined period of time; and
devices that are identified as being Internet of Things (IoT) devices, set-top boxes (STBs), or mobile devices that cannot be steered or refuse to be steered.

8. The method according to claim 7, wherein:
the multiple APs include a gateway device and one or more wireless extenders.

9. The method according to claim 7, wherein automatically detecting that the at least one electronic client device is the pre-determined type of electronic device that is non-steerable includes performing deep packet inspection (DPI) of traffic from the at least one electronic client device to obtain a device identification category of the at least one electronic device that identifies the at least one electronic device as a stationary low-bandwidth client device, wherein the device identification category includes at least one of device vendor, operating system (OS), class of device, name of device, and type of device.

10. The method according to claim 7, wherein automatically detecting that the at least one electronic client device is the pre-determined type of electronic device that is non-steerable includes at least one of:
obtaining information about the at least one electronic client device during a Wi-Fi protected setup (WPS) pairing operation with the WLAN, and comparing the information about the at least one electronic client device to a stored database to determine whether the at least one electronic client device is a stationary low-bandwidth client device, wherein the information about the at least one electronic client device includes at least one of device manufacturer, model number of device, and model name of device; and
determining that the at least one electronic client device is stationary relative to a nearest access point among the multiple APs in response to a variation of received signal strength indicator (RSSI) of the at least one electronic client device to the nearest AP over a pre-determined period of time being less than a threshold RSSI variation value, and determining that at least one of a maximum average bandwidth usage and a peak bandwidth usage of the at least one electronic client device over the predetermined period of time is below a threshold bandwidth usage value.

11. The method according to claim 7, wherein the steering event may include at least one of:
a link quality event, in response to detecting a candidate electronic client device having a link quality to an access point among the multiple APs that is below a threshold link quality value,
a channel utilization event, in response to detecting an access point among the multiple APs having a channel utilization that is greater than a threshold channel utilization value,
a backhaul link utilization event, in response to detecting an access point among the multiple APs having a backhaul link utilization that is greater than a threshold backhaul link utilization value, and
a proactive steering event, wherein the candidate electronic client device is steered from an access point among the multiple APs that has an associated station count that is greater than a threshold station count value to a candidate access point among the multiple APs that has an associated station count that is less than the threshold station count value,
wherein the at least one electronic client device in the no-steer list is not subjected to a link quality check, a channel utilization check, a backhaul link utilization check, or a proactive steering check.

12. The method according to claim 7, further comprising:
automatically adjusting station count limits of access points among the multiple APs based on a number of the non-steerable electronic client devices in the no-steer list that are associated with each access point, respectively; and
in response to detecting the steering event,
performing a candidate access point determination operation to generate a prioritized list of candidate APs with adjusted associated station count limits to which the candidate electronic client devices may be auto-steered; and
selecting a candidate AP from the prioritized list of candidate APs to which the selected candidate electronic client device is auto-steered based on the candidate access point determination operation,
wherein access points among the multiple APs having a number of electronic client devices associated therewith that is above the adjusted station count limits are excluded from the candidate access point determination operation, such that the access points exceeding the adjusted station count limits are removed from consideration when generating the prioritized list of candidate APs to which the candidate electronic client devices may be auto-steered.

13. A non-transitory computer-readable medium storing a program of instructions for automatically steering electronic client devices between multiple access points (APs) of a wireless local area network (WLAN), the instructions when executed by a processor of a network controller causing the network controller to perform operations comprising:
automatically detecting at least one electronic client device gaining access to the WLAN via wireless communications with one of the multiple APs as being a pre-determined type of electronic device that is non-steerable;
automatically assigning the at least one electronic client device that is detected as being the pre-determined type of electronic device that is non-steerable to a no-steer list; and
in response to detecting a steering event:
performing a steering trigger and target station selection operation to generate an ordered list of candidate electronic client devices that are available for auto-steering between the multiple APs of the WLAN; and
selecting a candidate electronic client device from the ordered list of candidate electronic client devices to be auto-steered between the multiple APs of the WLAN based on the steering trigger and target station selection operation;
wherein non-steerable electronic client devices in the no-steer list are excluded from the steering trigger and target station selection operation, such that the at least one electronic client device that is non-steerable is prevented from being automatically assigned to the ordered list of candidate electronic client devices that are available for auto-steering; and
wherein the pre-determined type of electronic device that is non-steerable includes at least one of:
devices that are stationary relative to a nearest AP among the multiple APs of the WLAN and have bandwidth usage below a threshold value for at least a predetermined period of time, and
devices that are identified as being Internet of Things (IoT) devices, set-top boxes (STBs), or mobile devices that cannot be steered or refuse to be steered.

14. The non-transitory computer-readable medium according to claim 13, wherein:
the multiple APs include a gateway device and one or more wireless extenders.

15. The non-transitory computer-readable medium according to claim 13, wherein automatically detecting that the at least one electronic client device is the pre-determined type of electronic device that is non-steerable includes performing deep packet inspection (DPI) of traffic from the at least one electronic client device to obtain a device identification category of the at least one electronic device that identifies the at least one electronic device as a stationary low-bandwidth client device, wherein the device identification category includes at least one of device vendor, operating system (OS), class of device, name of device, and type of device.

16. The non-transitory computer-readable medium according to claim 13, wherein automatically detecting that the at least one electronic client device is the pre-determined type of electronic device that is non-steerable includes at least one of:
obtaining information about the at least one electronic client device during a Wi-Fi protected setup (WPS) pairing operation with the WLAN, and comparing the information about the at least one electronic client device to a stored database to determine whether the at least one electronic client device is a stationary low-bandwidth client device, wherein the information about the at least one electronic client device includes at least one of device manufacturer, model number of device, and model name of device; and
determining that the at least one electronic client device is stationary relative to a nearest access point among the multiple APs in response to a variation of received signal strength indicator (RSSI) of the at least one electronic client device to the nearest AP over a pre-determined period of time being less than a threshold RSSI variation value, and determining that at least one of a maximum average bandwidth usage and a peak bandwidth usage of the at least one electronic client device over the predetermined period of time is below a threshold bandwidth usage value.

17. The non-transitory computer-readable medium according to claim 13, wherein the steering event may include at least one of:
a link quality event, in response to detecting a candidate electronic client device having a link quality to an access point among the multiple APs that is below a threshold link quality value,
a channel utilization event, in response to detecting an access point among the multiple APs having a channel utilization that is greater than a threshold channel utilization value,
a backhaul link utilization event, in response to detecting an access point among the multiple APs having a backhaul link utilization that is greater than a threshold backhaul link utilization value, and
a proactive steering event, wherein the candidate electronic client device is steered from an access point among the multiple APs that has an associated station count that is greater than a threshold station count value to a candidate access point among the multiple APs that has an associated station count that is less than the threshold station count value,
wherein the at least one electronic client device in the no-steer list is not subjected to a link quality check, a channel utilization check, a backhaul link utilization check, or a proactive steering check.

18. The non-transitory computer-readable medium according to claim 13, wherein the instructions when executed by the processor further causing the network controller to perform operations comprising:
- automatically adjusting station count limits of access points among the multiple APs based on a number of the non-steerable electronic client devices in the no-steer list that are associated with each access point, respectively; and
- in response to detecting the steering event,
  - performing a candidate access point determination operation to generate a prioritized list of candidate APs with adjusted associated station count limits to which the candidate electronic client devices may be auto-steered; and
  - selecting a candidate AP from the prioritized list of candidate APs to which the selected candidate electronic client device is auto-steered based on the candidate access point determination operation,
- wherein access points among the multiple APs having a number of electronic client devices associated therewith that is above the adjusted station count limits are excluded from the candidate access point determination operation, such that the access points exceeding the adjusted station count limits are removed from consideration when generating the prioritized list of candidate APs to which the candidate electronic client devices may be auto-steered.

* * * * *